(12) United States Patent
Noba

(10) Patent No.: US 7,874,683 B2
(45) Date of Patent: Jan. 25, 2011

(54) MOBILE PHONE WITH AN IMAGE PROJECTION DEVICE

(75) Inventor: Koya Noba, Fujiyoshida (JP)

(73) Assignee: Citizen Electronics Co., Ltd., Fujiyoshida-shi, Yamanashi-ken (JP)

( * ) Notice: Subject to any disclaimer, the term of this patent is extended or adjusted under 35 U.S.C. 154(b) by 676 days.

(21) Appl. No.: 11/866,212

(22) Filed: Oct. 2, 2007

(65) Prior Publication Data

US 2008/0079916 A1 Apr. 3, 2008

(30) Foreign Application Priority Data

Oct. 3, 2006 (JP) ............................. 2006-271421

(51) Int. Cl.
G03B 21/14 (2006.01)
G03B 21/00 (2006.01)

(52) U.S. Cl. ........................... 353/39; 353/119; 353/70; 353/122

(58) Field of Classification Search ................... 353/39, 353/46, 119, 122; 359/23, 466
See application file for complete search history.

(56) References Cited

U.S. PATENT DOCUMENTS 7,637,677 B2 * 12/2009 Silverbrook ................. 400/88

FOREIGN PATENT DOCUMENTS

| JP | 2-184886 A | | 7/1990 |
|---|---|---|---|
| JP | 05-019700 | * | 1/1993 |
| JP | 7-58814 A | | 3/1995 |
| JP | 2001-313702 A | | 11/2001 |
| JP | 2002-27060 A | | 1/2002 |
| JP | 2004-317871 A | | 11/2004 |

OTHER PUBLICATIONS

Noba, U.S. patent application entitled "Mobile Phone", U.S. Appl. No. 11/801,485, filed May 10, 2007.
Noba, U.S. patent application entitled "Mobile Phone", U.S. Appl. No. 11/731,804, filed Mar. 30, 2007.

* cited by examiner

Primary Examiner—Tony Ko
(74) Attorney, Agent, or Firm—Brinks Hofer Gilson & Lione (57) ABSTRACT

A mobile phone includes an information display device and an image projection device. The information display device has a transmissive liquid crystal panel (13) for information display that has a specific region (13a) in a part thereof. The information display device further has a backlight unit (17) that illuminates the transmissive liquid crystal panel. The image projection device has a light source (14) that illuminates the specific region (13a), and a projection lens (18) that directs light from the light source (14) received through the specific region toward a screen.

10 Claims, 12 Drawing Sheets

MOBILE PHONE WITH AN IMAGE PROJECTION DEVICE

This application Claims priority under 35 U.S.C. §119 to Japanese Patent Application No. JP2006-271421 filed Oct. 3, 2006, the entire content of which is hereby incorporated by reference.

BACKGROUND OF THE INVENTION

1. Field of the Invention

The present invention relates to mobile phones and, more particularly, to a mobile phone having an image projection function.

2. Description of the Related Art

In recent years, portable terminal devices such as mobile phones that are equipped with an image projection device (projector) have been developed.

Figure 12:
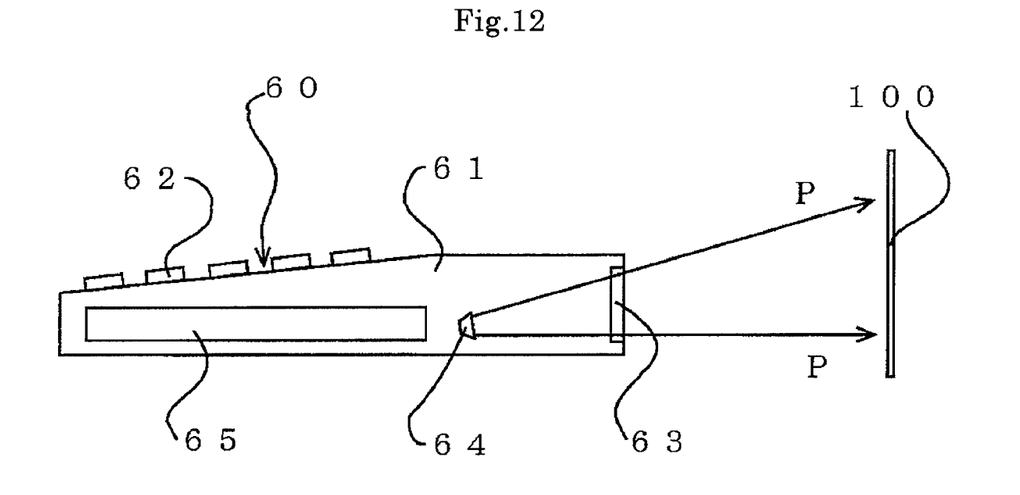
FIG. 12 is a schematic view of a basic structure of a conventional portable terminal device having an image projection function, showing the state where image projection is being performed with it.

For example, Japanese Patent Application Publication No. Hei 2-184886 discloses a portable terminal device as shown in FIG. 12. This portable terminal device has a terminal device body 61, a keypad 62, a transmissive liquid crystal panel 63 that forms an image for projection, a light source 64 for image projection, and a control unit 65. In this device, the control unit 65 is operated through the keypad 62 to form an image on the transmissive liquid crystal panel 63 according to a control signal from the control unit 65, and light P from the light source 64 passing through the transmissive liquid crystal panel 63 is projected on a screen 100.

Figure 13:
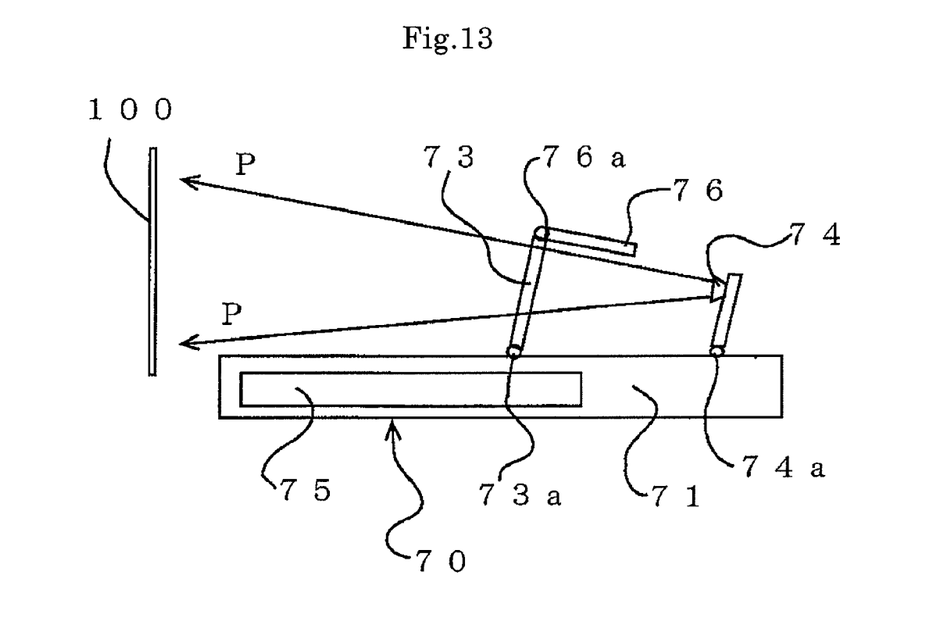
FIG. 13 is a schematic view of a basic structure of a conventional mobile phone having an image projection function, showing the state where image projection is being performed with it.

Japanese Patent Application Publication No. 2004-317871 discloses a mobile phone as shown in FIG. 13. This mobile phone has a transmissive liquid crystal panel 73 and a projection lamp 74 that are pivotally attached to a mobile phone body 71 through respective pivot shafts 73a and 74a. An image that is formed on the transmissive liquid crystal panel 73 according to a control signal from a control unit 75 is projected on a screen 100 by light from the projection lamp 74.

The above-described portable terminal device and mobile phone, however, have no lens for projection. Therefore, the projected image can appear sharp only on the screen placed in close proximity to the transmissive liquid crystal panel. Thus, a sufficient magnified image projection function cannot be attained.

Accordingly, it is practically necessary to provide a projection lens in front of the transmissive liquid crystal panel.

Figure 14A:
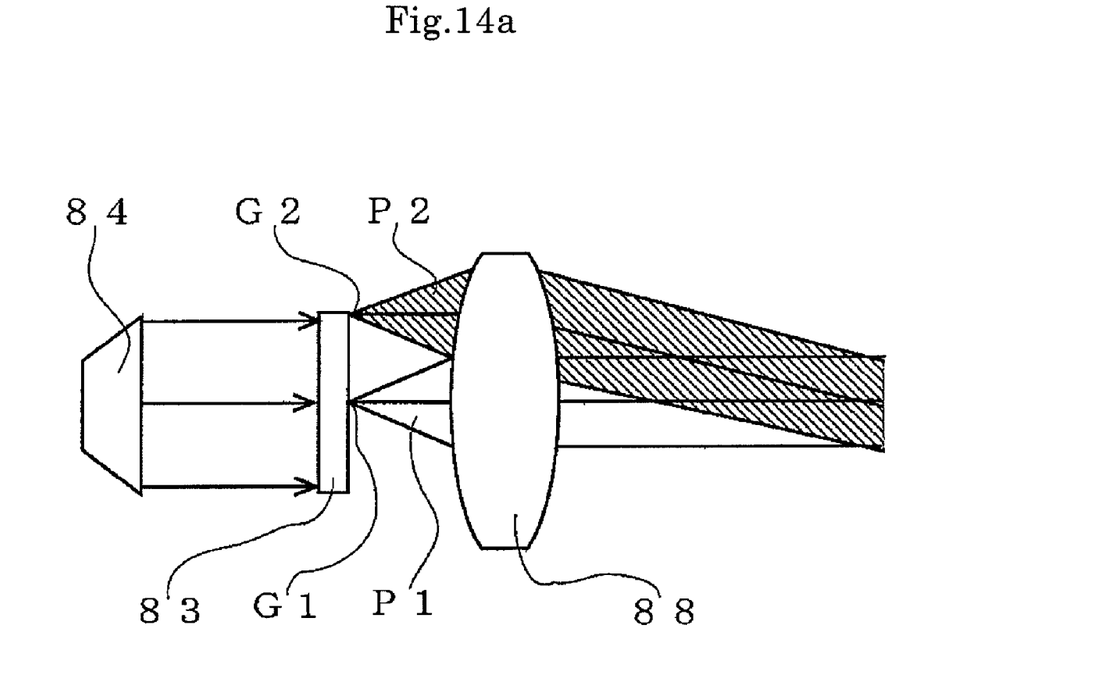
FIG. 14a shows a case where the projection lens is larger in shape than the transmissive liquid crystal panel.

FIG. 14 shows a projection lens 88 provided in front of a transmissive liquid crystal panel 83 that is illuminated by a light source 84 for image projection. If the projection lens 88 is larger in shape than the transmissive liquid crystal panel 83 as shown in part (a) of FIG. 14, both image light $P_1$ from the vicinity of the center $G_1$ of the transmissive liquid crystal panel 83 and image light $P_2$ from the vicinity of a peripheral edge point $G_2$ of the transmissive liquid crystal panel 83 pass through the projection lens 88 and are imaged on the screen 100.

Figure 14B:
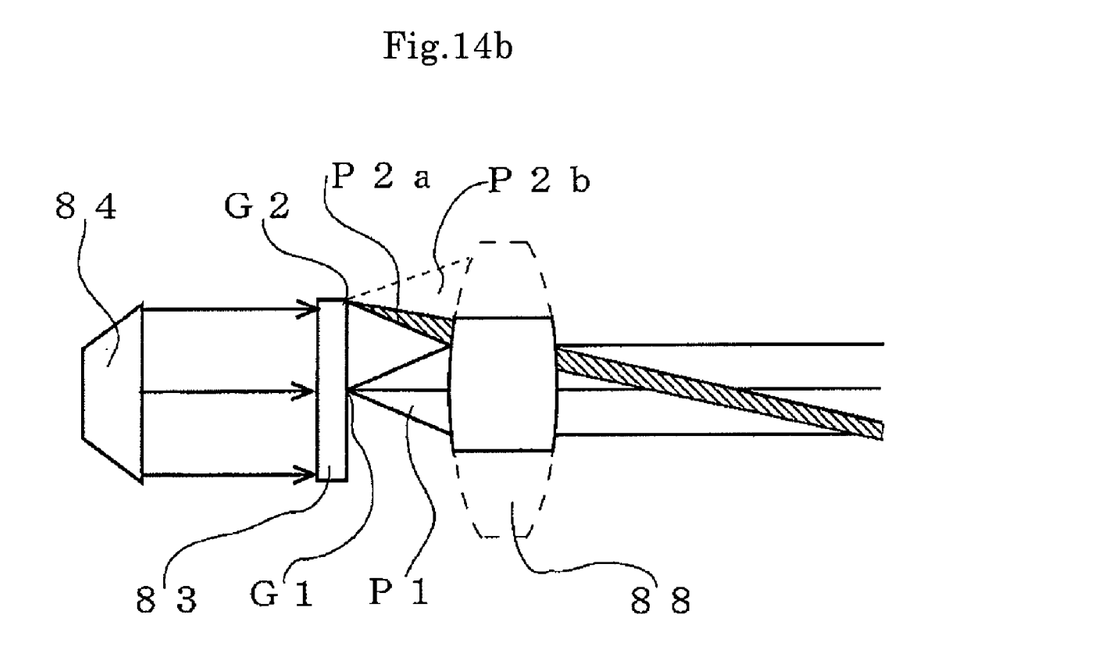
FIG. 14b shows a case where the projection lens is smaller in shape than the transmissive liquid crystal panel.

In contrast, if the projection lens 88 is smaller in shape than the transmissive liquid crystal panel 83, as shown in part (b) of FIG. 14, all the image light $P_2$ from the peripheral edge point $G_2$ of the transmissive liquid crystal panel 83 cannot pass through the projection lens 88, but only a part $P_{2a}$ (hatched portion) thereof passes through the projection lens 88 and is imaged on the screen 100.

Accordingly, when the projection lens 88 is smaller than the transmissive liquid crystal panel 83, the image formed on the screen 100 is darker than when the projection lens 88 is larger than the transmissive liquid crystal panel 83. Therefore, it is preferable to use a projection lens larger in shape than a transmissive liquid crystal panel on which an image to be projected is formed.

In general, however, a liquid crystal panel for information display used in a mobile phone is maximized to nearly the size of the external shape of the mobile phone body in a display part of the mobile phone. Therefore, if a projection lens larger than the liquid crystal panel is installed in the mobile phone, the size of the mobile phone unavoidably needs to be increased, which will impair the portability of the mobile phone.

SUMMARY OF THE INVENTION

The present invention has been made in view of the above-described circumstances.

Accordingly, an object of the present invention is to provide a mobile phone having an image projection function incorporated therein without impairing the portability thereof by enabling mounting of a projection lens larger in size than a specific region of a liquid crystal panel for forming an image for projection, with the size of the mobile phone kept from becoming much larger than that in the state of the art.

The present invention provides a mobile phone including an information display device and an image projection device. The information display device has a transmissive liquid crystal panel for information display that has a specific region therein. The image projection device has a light source that illuminates the specific region, and a projection lens that directs light from the light source received through the specific region toward a screen.

In this mobile phone, an image for image projection is formed by using a specific region in a part of a transmissive liquid crystal panel for information display. Therefore, even if a projection lens larger in size than the specific region is prepared, the lens can be accommodated in the mobile phone. Accordingly, a sharp and large image can be projected without impairing the portability of the mobile phone.

Specifically, the information display device may further have a planar light source using a light guide plate as a light source for illuminating the transmissive liquid crystal panel. The light source for image projection may be a light-emitting diode device that is different from the light source that illuminates the transmissive liquid crystal panel. Light-emitting diodes are small in size and high in luminance and hence suitable for image projection. External light or front light is also supposed to be usable as a light source that illuminates the transmissive liquid crystal panel. However, in the embodiments of the present invention, this light source is explained as being a backlight unit.

More specifically, a part of the transmissive liquid crystal panel may be used as the specific region. The transmissive liquid crystal panel may be slidably or pivotally attached so as to be displaceable between an information display position and an image projection position. When the transmissive liquid crystal panel is in the image projection position, the specific region is aligned with the light source that illuminates the specific region in the direction of the optical axis of the light source.

With the above-described arrangement, a single transmissive liquid crystal panel is adapted to be displaceable so as to be selectively usable for information display and image projection.

The projection lens may be adapted to be displaceable between a housed position in a mobile phone body and an image projection position outside the mobile phone body. In this case, when the projection lens is in the image projection position, the projection lens is aligned with the light source that illuminates the specific region in the direction of the optical axis of the light source.

Alternatively, the projection lens may be detachable with respect to the mobile phone body. In this case, when the projection lens is attached to the mobile phone body, the projection lens is aligned with the light source that illuminates the specific region in the direction of the optical axis of the light source.

In a case where a separately prepared projection lens is adapted to be detachable with respect to the mobile phone body as stated above, it becomes possible to use a projection lens large in shape in comparison to the projection lens that is integrally attached to the mobile phone. The use of a separately prepared compact and detachable projection lens increases the number of alternatives to choose from in selecting a housing place of the projection lens in the mobile phone body and hence increases the design freedom of the mobile phone.

Further, the mobile phone may further include a mobile phone body that houses the information display device and the image projection device, and a charger prepared separately from the mobile phone body to electrically charge the mobile phone body. In this case, the charger is detachably attachable to the mobile phone body to supply the image projection device with driving electric power for image projection.

The charger enables supply of higher driving electric power and makes it possible to form a brighter and sharper projected image.

In the above-described mobile phone according to the present invention, the projection lens may have an effective area larger than the effective area of the specific region of the transmissive liquid crystal panel.

BRIEF DESCRIPTION OF THE DRAWINGS

FIG. 14 is a schematic view showing the relationship between a transmissive liquid crystal panel, a projection lens and projection light in a device having an image projection function, of which.

DESCRIPTION OF PREFERRED EMBODIMENTS

Embodiments of the mobile phone according to the present invention will be explained below with reference to the accompanying drawings.

FIGS. 1 to 6 show a mobile phone 10 according to a first embodiment of the present invention.

Figure 1:
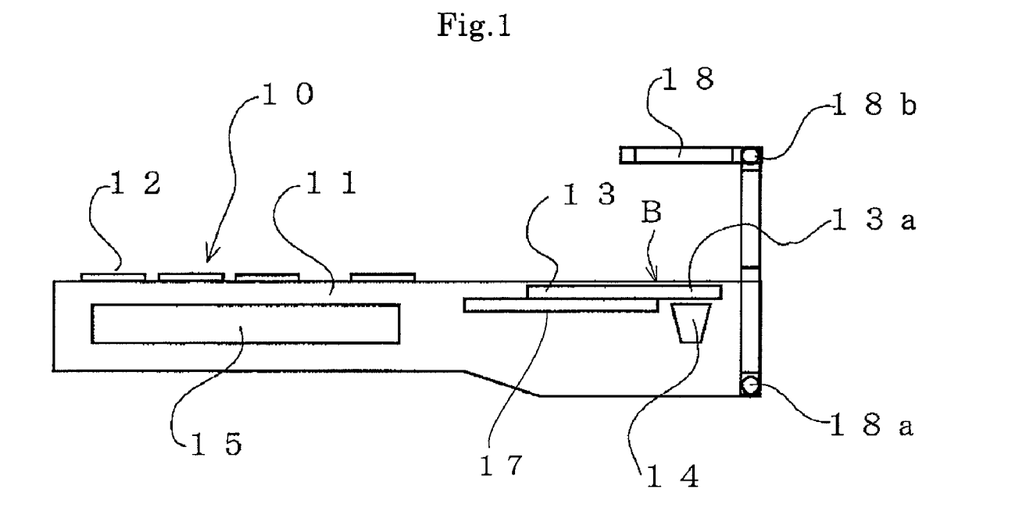
FIG. 1 is a schematic view for explaining a basic structure of a mobile phone according to a first embodiment of the present invention, showing the state where the mobile phone is set for image projection.

The mobile phone 10 has a mobile phone body 11, a keypad 12 provided on the mobile phone body 11, a transmissive liquid crystal panel 13 for information display, a backlight unit 17 using a light guide plate, an LED (light-emitting diode) device 14 as a light source for image projection, a projection lens 18, and a control unit 15.

Figure 4:
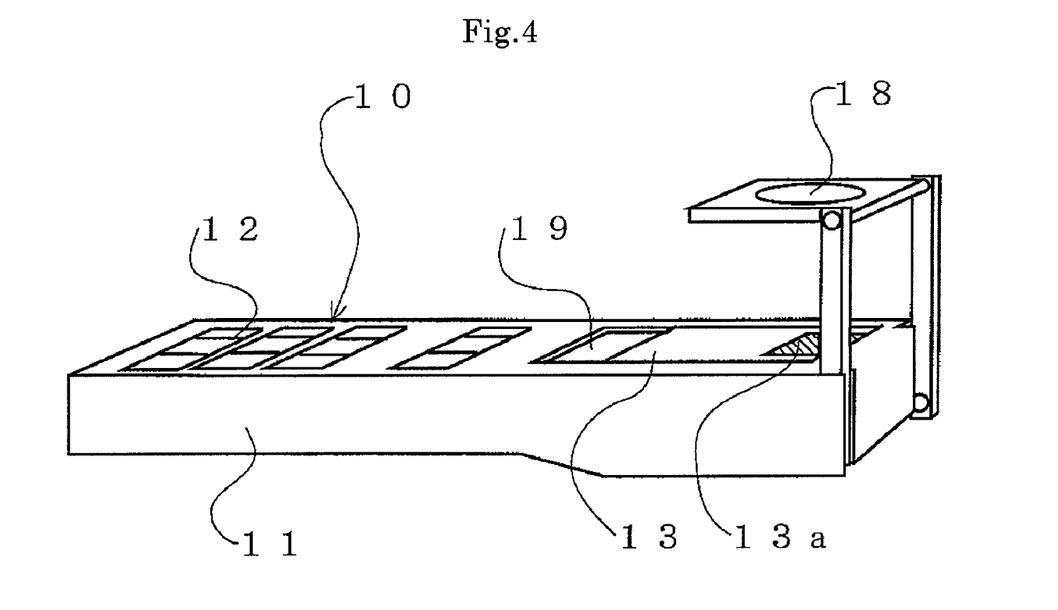
FIG. 4 is a perspective view of the mobile phone in FIG. 1, showing the state where it is set for image projection.
Figure 5:
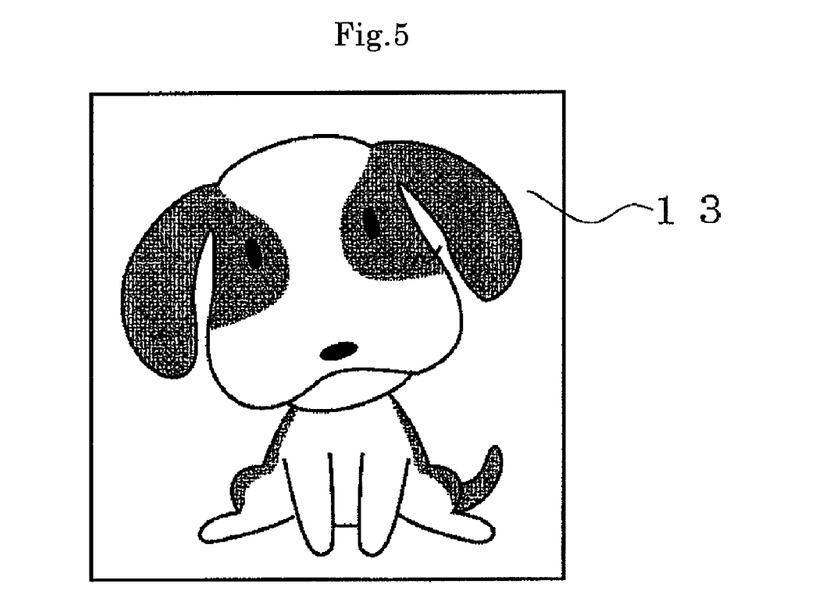
FIG. 5 is a plan view showing the way in which an image is formed on a transmissive liquid crystal panel when the mobile phone in FIG. 1 is used as an ordinary mobile phone.

The transmissive liquid crystal panel 13 is adapted to be slidable so as to be displaceable between an information display position A (FIG. 2) and an image projection position B (FIG. 1). When placed in the information display position A, the transmissive liquid crystal panel 13 is superimposed over the backlight unit 17. Specifically, as shown in FIG. 4, the transmissive liquid crystal panel 13 is arranged to slide within a slide window 19 provided on the front side of the mobile phone body 11.

Figure 2:
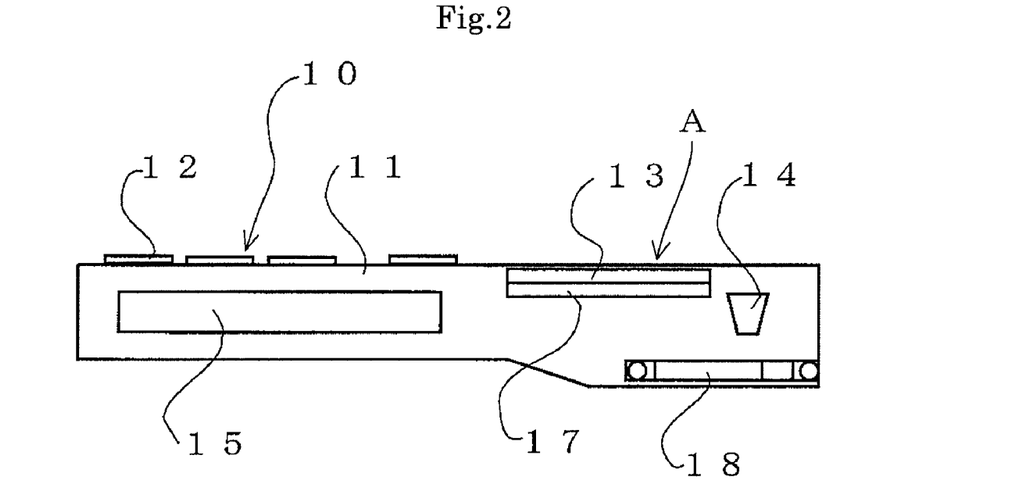
FIG. 2 is a schematic view of the mobile phone in FIG. 1, showing the state where it is used as an ordinary mobile phone.
Figure 3:
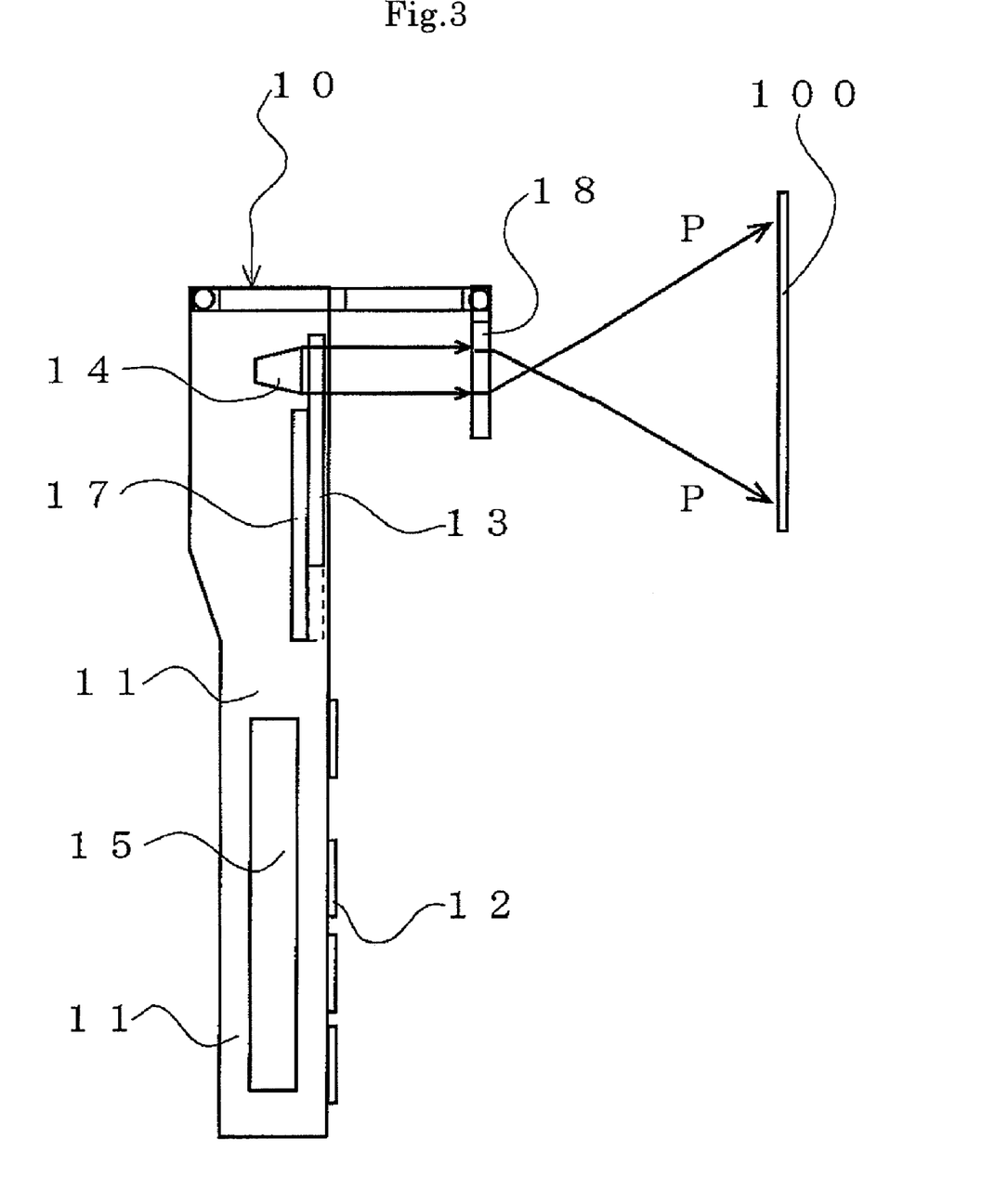
FIG. 3 is a schematic view of the mobile phone in FIG. 1, showing the state where image projection is being performed with it.

The projection lens 18 is supported by a folding arm structure having pivot shafts 18a and 18b so as to be displaceable between a folded position shown in FIG. 2 and an image projection position shown in FIG. 1.

When the mobile phone 10 is used as an ordinary mobile phone, the projection lens 18 is set in the folded position shown in FIG. 2, and the transmissive liquid crystal panel 13 is placed in the information display position A. In this setting, data concerning transmission and reception is displayed over the entire display area of the transmissive liquid crystal panel 13 according to a driving signal from the control unit 15.

When image projection is to be performed, the projection lens 18 is set in the image projection position B shown in FIG. 1. The transmissive liquid crystal panel 13 is slid into the image projection position B, so that a specific region 13a (see FIG. 4) thereof is aligned with the light source 14 for image projection. Consequently, the specific region 13a of the transmissive liquid crystal panel 13 and the projection lens 18 are aligned with each other on the optical axis of light from the light source 14.

It should be noted that setting of the projection lens 18 and sliding of the transmissive liquid crystal panel 13 may be performed either by a manual operation or by a motor driven in response to the actuation of a specific button on the keypad 12.

Then, the control unit 15 supplies a signal for forming an image on the specific region 13a of the transmissive liquid crystal panel 13 and a signal for turning on the light source 14. As a result, light from the light source 14 passes through the specific region 13a to form image light P, which is then magnified and projected on a screen 100 by the projection lens 18.

In the mobile phone 10, the projection lens 18 is a small-size lens, which allows accommodation of the projection lens 18 in the mobile phone 10. However, an image for image projection is formed in the specific region 13a, which is a part of the transmissive liquid crystal panel 13. Therefore, it is possible to satisfy the condition described above in connection with FIG. 14, i.e. the condition that the size of the projection lens should be larger than that of the image forming region. Accordingly, it becomes possible to project a magnified image on the screen 100 with sufficient brightness.

Figure 7:
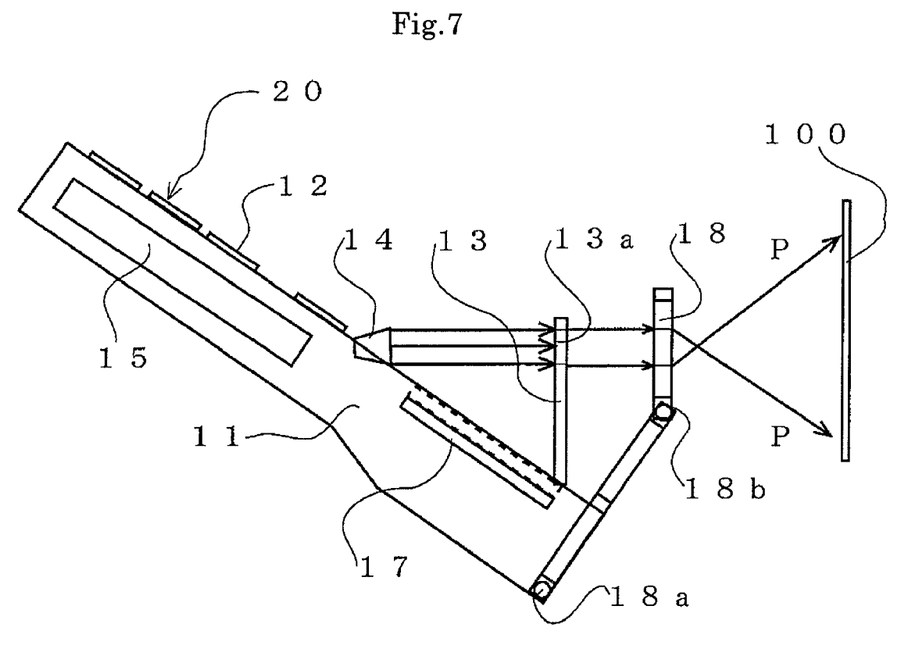
FIG. 7 is a schematic view of a mobile phone according to a second embodiment of the present invention, showing the state where it is used to perform image projection.

FIG. 7 shows a mobile phone 20 according to a second embodiment of the present invention.

The basic structure of the mobile phone 20 is the same as that of the mobile phone 10 shown in FIG. 1. Therefore, the same constituent elements of the mobile phone 20 as those of the mobile phone 10 are denoted by the same reference numerals as used in FIG. 1, and redundant explanation is omitted.

In the mobile phone 20, the transmissive liquid crystal panel 13 and the light source 14 for image projection are pivotably attached to the surface of the mobile phone body 11. When image projection is to be performed, the transmissive liquid crystal panel 13 and the light source 14 are erected from the surface of the mobile phone body 11 by a predetermined angle so that the specific region 13a of the transmissive liquid crystal panel 13 is positioned substantially perpendicular to the optical axis of light from the light source 14. The projection lens 18 is also erected to extend over the front side of the mobile phone body 11 so as to be substantially perpendicular to the optical axis of light from the light source 14.

In the mobile phone 20, the transmissive liquid crystal panel 13 and the projection lens 18 can be pivotally displaced to extend outward of the mobile phone body 11. Therefore, the projected image size and so forth can be adjusted by controlling the distance between the light source 14 and the transmissive liquid crystal panel 13 and the distance between the transmissive liquid crystal panel 13 and the projection lens 18. In addition, when an image is to be projected in front of the operator, the mobile phone need not be turned to change its orientation as in the foregoing first embodiment. The desired image can be projected simply by tilting the mobile phone. Thus, it is easy to operate the mobile phone when performing image projection.

Figure 8:
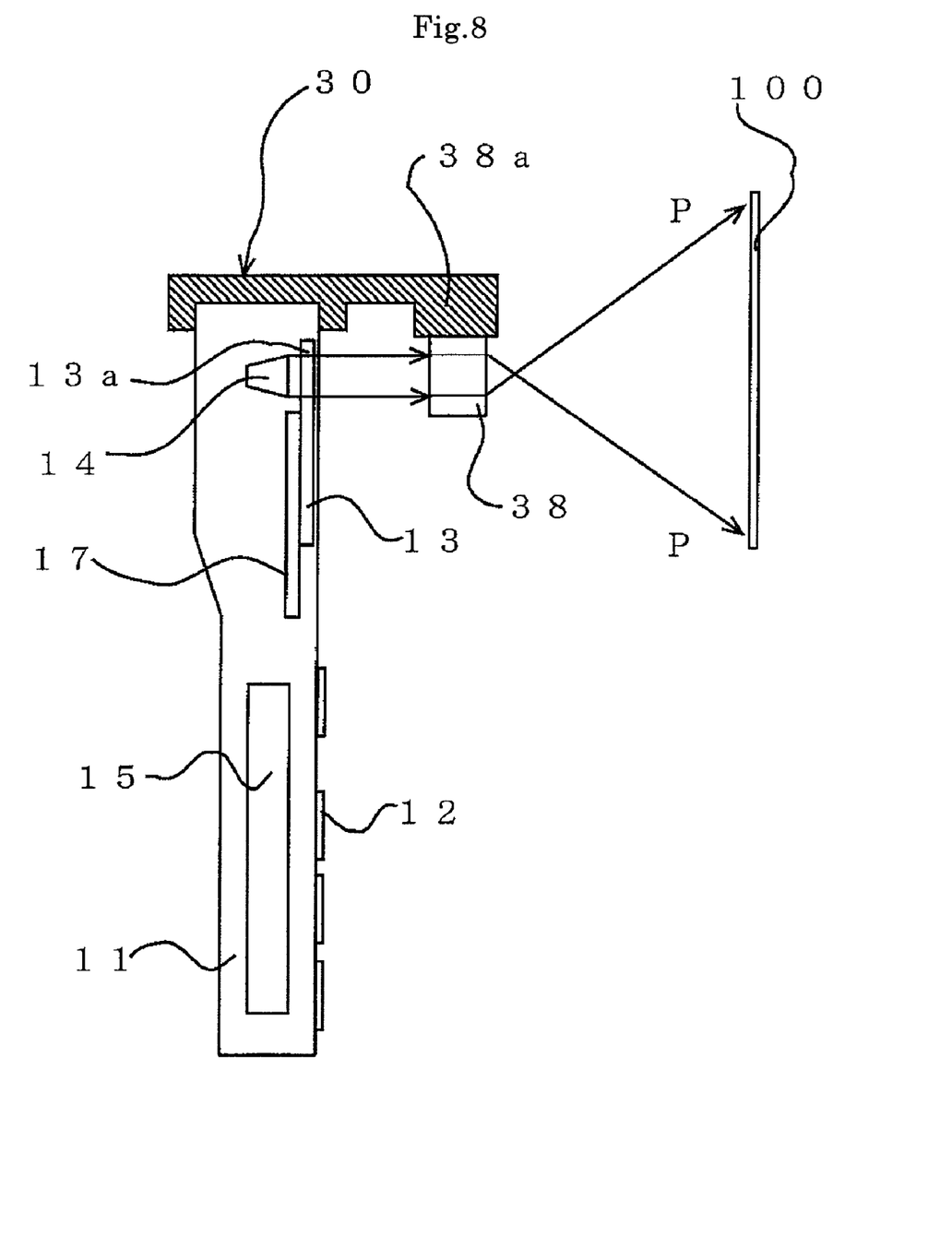
FIG. 8 is a schematic view of a mobile phone according to a third embodiment of the present invention, showing the state where it is used to perform image projection.

FIG. 8 shows a mobile phone 30 according to a third embodiment of the present invention.

The mobile phone 30 has substantially the same structure as that of the mobile phone 10 according to the first embodiment. In the mobile phone 30, a projection lens 38 is provided separately from the mobile phone body 11, and a fitting member 38a is removably fitted to the mobile phone body 11, thereby positioning the projection lens 38 with respect to the mobile phone body 11.

When image projection is to be performed, the projection lens 38 is attached to the mobile phone body 11 through the fitting member 38a. Thereafter, the transmissive liquid crystal panel 13 is slid into the image projection position B, whereby the light source 14, the specific region 13a of the transmissive liquid crystal panel 13 and the projection lens 38 are set on the same optical axis.

In the mobile phone 30, the projection lens 38 is adapted to be detachable with respect to the mobile phone body 11. Therefore, it is possible to increase the projection magnification or to obtain a higher-definition projected image by increasing the lens diameter of the projection lens 38 or using a combination lens as the projection lens 38.

Figure 9:
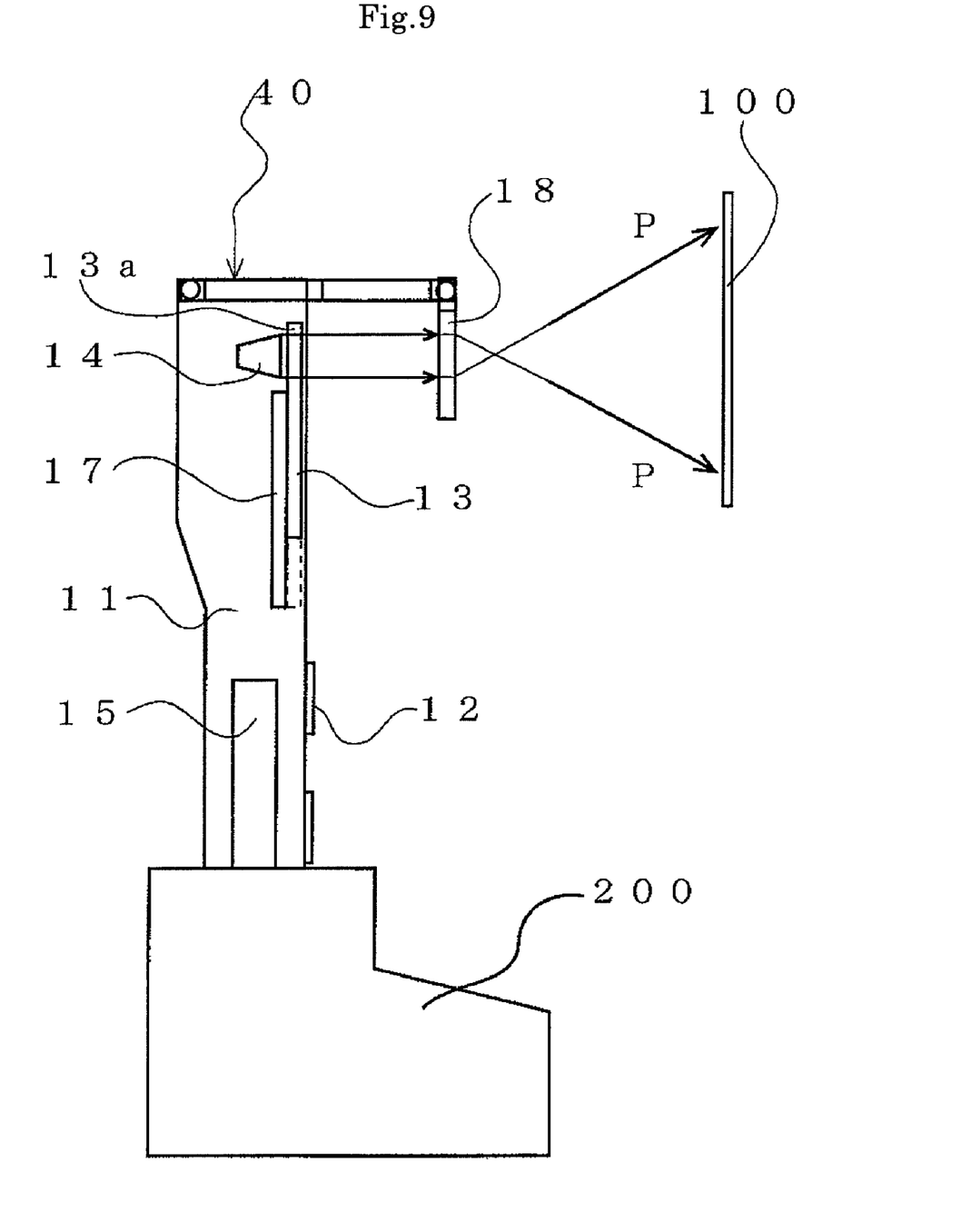
FIG. 9 is a schematic view of a mobile phone according to a fourth embodiment of the present invention, showing the state where it is used to perform image projection.

FIG. 9 shows a mobile phone 40 according to a fourth embodiment of the present invention.

In the mobile phone 40, driving electric power for the light source 14 for image projection is supplied from a charger 200 for mobile phones that is separately prepared and adapted to be detachable with respect to the mobile phone body 11. Therefore, when image projection is performed, sufficient driving electric power can be supplied to the light source 14 for image projection to obtain a bright and sharp projected image.

Figure 10:
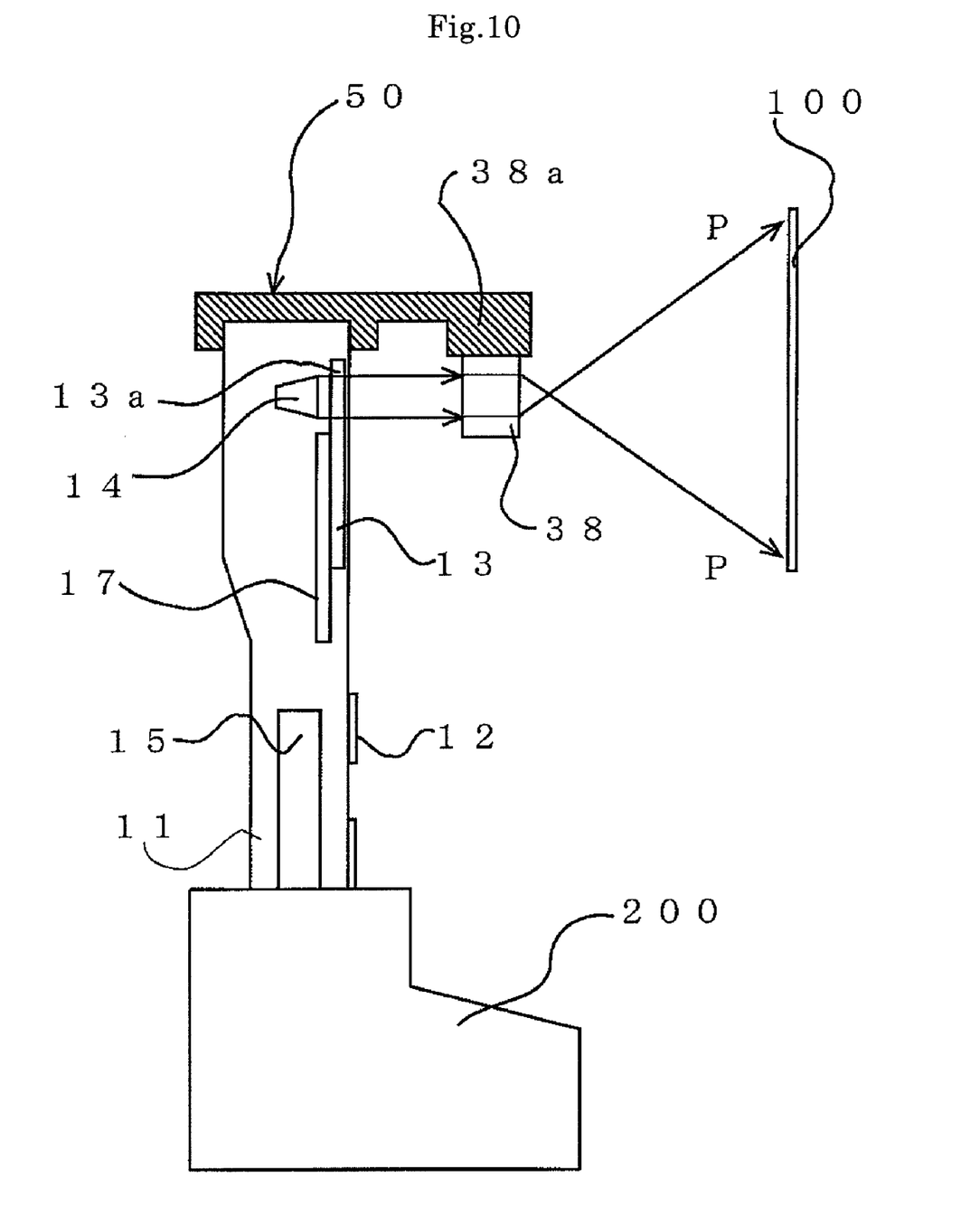
FIG. 10 is a schematic view of a mobile phone according to a fifth embodiment of the present invention, showing the state where it is used to perform image projection.

FIG. 10 shows a mobile phone 50 according to a fifth embodiment of the present invention.

In the mobile phone 50, the projection lens 38 is arranged in the same way as in the embodiment shown in FIG. 8, and driving electric power for the light source 14 for image projection is supplied from the charger 200 for mobile phones in the same way as in the case of the mobile phone 40 shown in FIG. 9. In the mobile phone 50, the mobile phone charger 200 is placed at the lower side of the mobile phone body 11 so as to be used as a stand for the mobile phone body 11, thereby allowing the mobile phone 50 to perform image projection in a stable state.

Figure 15:
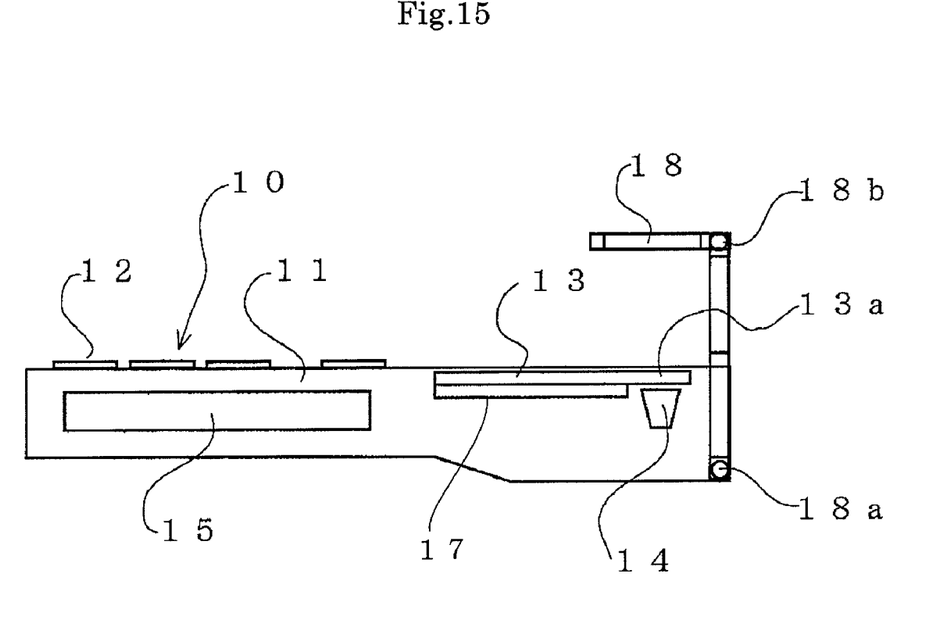
FIG. 15 is a schematic view illustrating a modification of the mobile phone according to the first embodiment shown in FIG. 1.

FIG. 15 shows a modification of the embodiment shown in FIG. 1.

In the mobile phone according to this modification, the transmissive liquid crystal panel 13 is not adapted to be slidable but has an extension 13a that extends to a position where it is aligned with the optical axis of light from the LED device 14. That is, when this mobile phone is used as an ordinary mobile phone, the backlight unit 17 is turned on, whereas when it is used to perform image projection, the LED device 14 is turned on instead of using the backlight unit 17.

Figure 16:
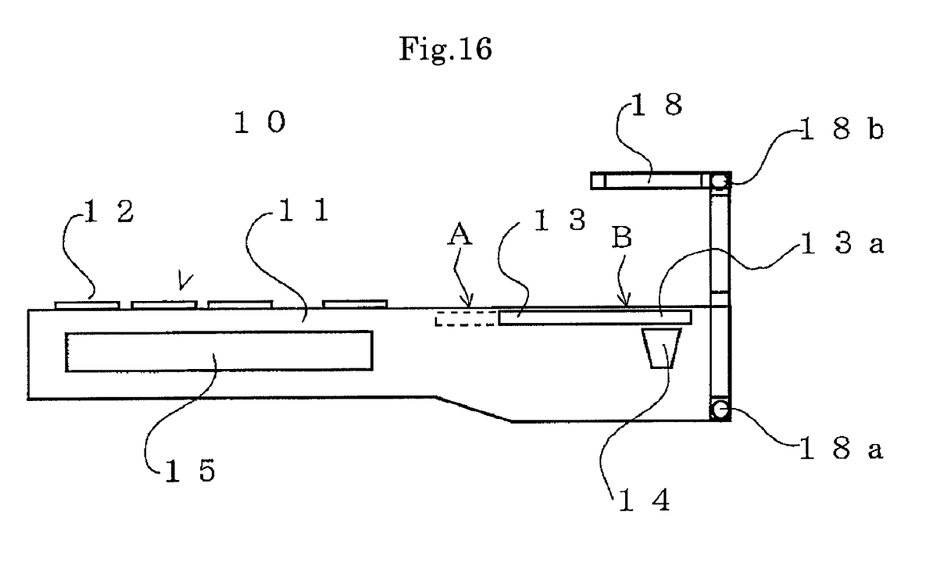
FIG. 16 is a schematic view illustrating another modification of the mobile phone according to the first embodiment shown in FIG. 1.

FIG. 16 shows another modification of the embodiment shown in FIG. 1.

In the mobile phone according to this modification, the transmissive liquid crystal panel 13 is adapted to be slidable between the information display position A and the image projection position B in the same way as in the case of FIG. 1, but the backlight unit 17, which is provided in the mobile phone shown in FIG. 1, is not provided. External light or front light may be used to view the transmissive liquid crystal panel 13.

In recent years, it has been made possible to display a personal computer's display screen, a television broadcast screen, etc. on the display panel of a mobile phone. The use of the above-described image projection function enables such a personal computer's display screen or a television broadcast screen to be viewed in a magnified form.

Figure 11:
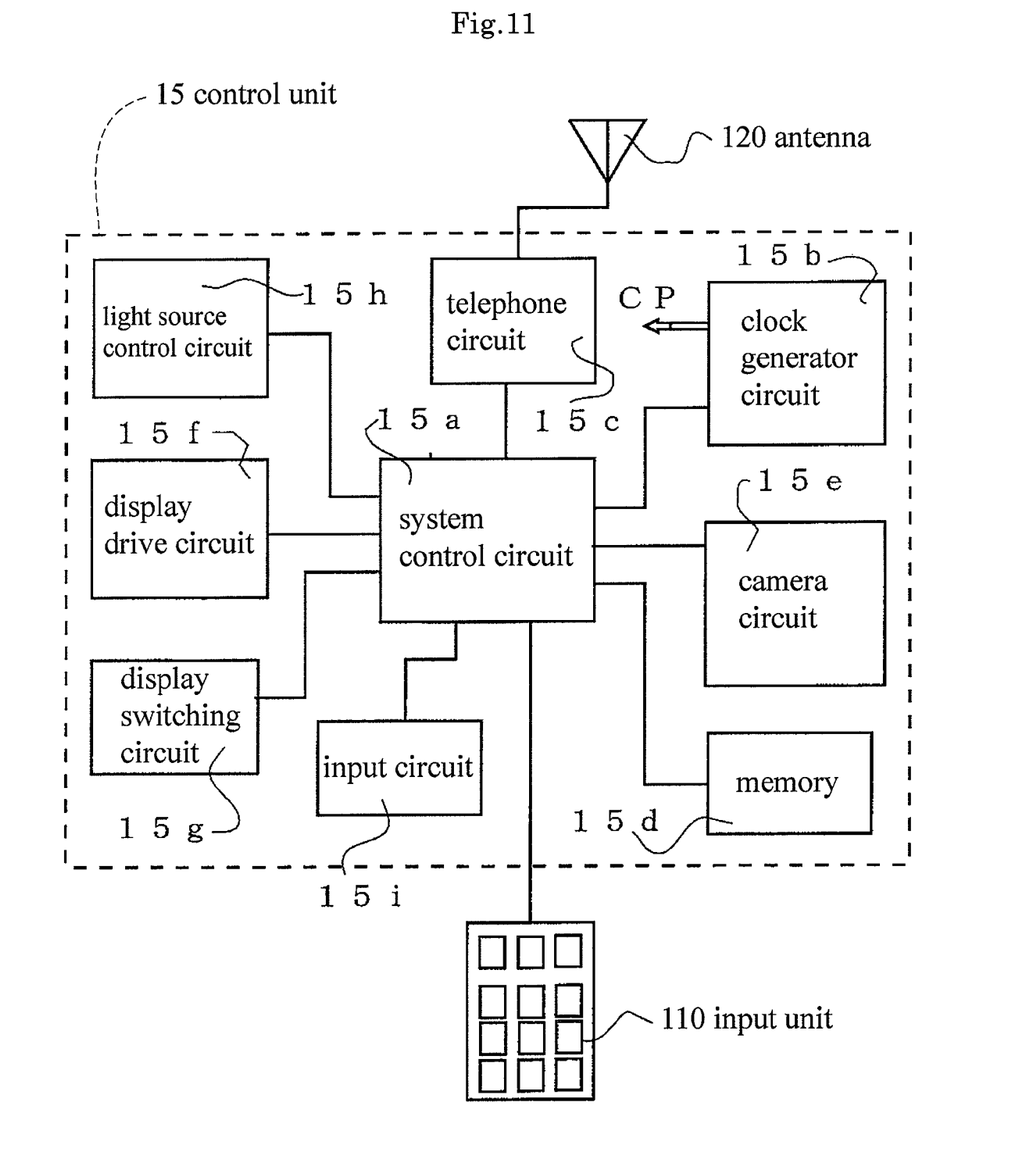
FIG. 11 is a block diagram of a control system of a mobile phone according to the present invention.

FIG. 11 is a block diagram showing the arrangement of the control unit 15 in the mobile phone according to the present invention.

The control unit 15 comprises a system control circuit 15a, a clock generator circuit 15b, a telephone circuit 15c, a memory 15d, a camera circuit 15e, a display drive circuit 15f, a display switching circuit 15g, a light source control circuit 15h, an input circuit 15i, and so forth. In addition, an input unit 110 that is actuated through the keypad 12 is connected to the system control circuit 15a, and an antenna 120 is connected to the telephone circuit 15c.

The system control circuit 15a receives an input signal from the input unit 110 and supplies a control signal to each circuit to control the telephone function, camera function, image projection function, etc. of the mobile phone. The clock generator circuit 15b generates various clock signals CP in response to a control signal from the system control circuit 15a and supplies them to each circuit. The memory 15d stores information such as call records and messages in transmission and reception and image data in the camera function and further stores projection information in the image projection function. The input circuit 15i receives, for example, information concerning image projection that is supplied externally.

Figure 6:
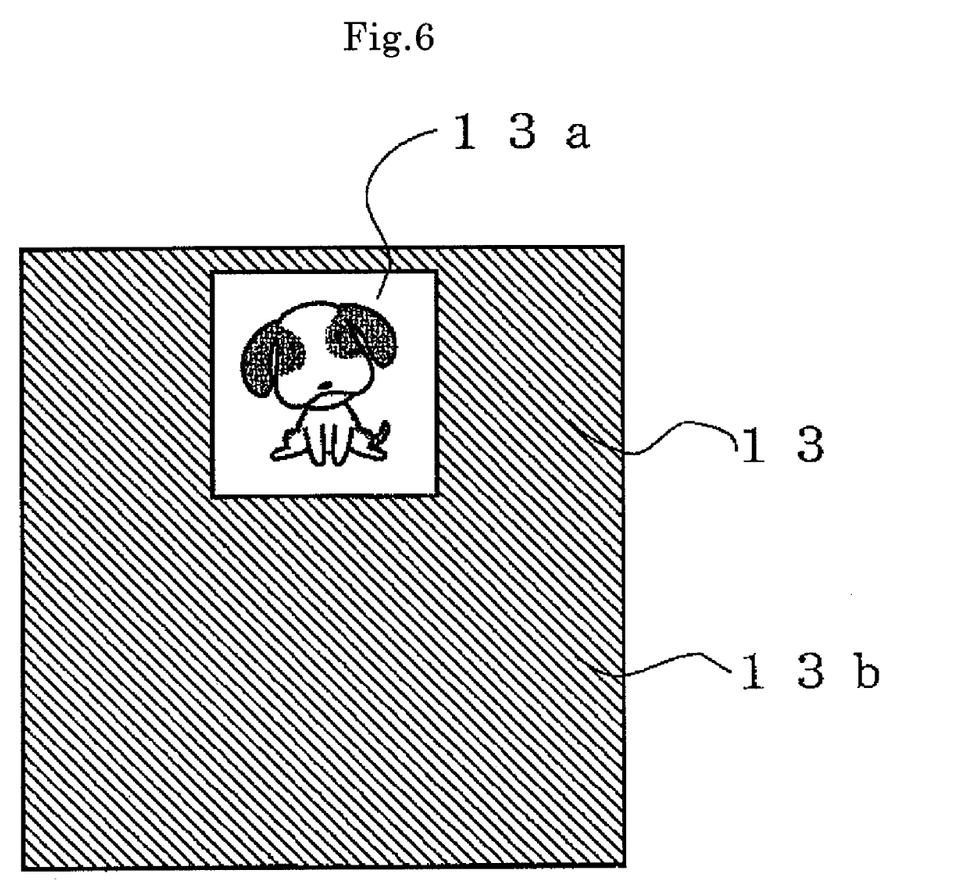
FIG. 6 is a plan view similar to FIG. 5, showing the way in which an image is formed on the transmissive liquid crystal panel when the mobile phone in FIG. 1 is used to perform image projection.

When image projection is to be performed with the mobile phone according to the present invention, an image projection function selecting signal is supplied to the system control circuit 15a from the input unit 110 by actuating the keypad 12. Upon receipt of the image projection function selecting signal, the system control circuit 15a supplies a switching signal to the display switching circuit 15g. The display switching circuit 15g upon receiving the switching signal controls the display drive circuit 15f so that the transmissive liquid crystal panel 13 performs image formation in the specific region 13a as shown in FIG. 6.

At the same time, the system control circuit 15a supplies a switching signal to the light source control circuit 15h. The light source control circuit 15h upon receiving the switching signal switches the light source to be ON from the backlight unit 17, which illuminates the whole transmissive liquid crystal panel 13, to the light source 14 for image projection, which illuminates the specific region 13a. Further, the system control circuit 15a receives information concerning image projection that is entered from the input circuit 15i and supplies a drive signal to the display drive circuit 15f to perform image formation in the specific region 13a.

In the mobile phones according to the foregoing embodiments, the projection lens 18 of the type that allows its accommodation in the mobile phone body 11 is arranged by fixedly housing a convex lens in a holder casing provided in the mobile phone body 11. If a single convex lens having a diameter of about 20 mm and a thickness of about 5 mm is used and the specific region 13a of the transmissive liquid crystal panel 13 has a diagonal dimension of about 14 mm, an image having a diagonal dimension of about 350 mm can be projected on the screen 100.

If an LED device is used as the light source 14 for image projection, the light source 14 can be made compact in size, and a high luminance can be obtained by low-voltage drive. Light emitted from the LED device should preferably be applied to the transmissive liquid crystal panel 13 after being converted into substantially parallel rays through a condenser lens. In the foregoing embodiments, if an LED device providing a total luminous flux of about 50 lm (lumen) is used as the light source 14, an illuminance of about 100 lx (lux) can be obtained as the brightness of the projected image. Thus, it is possible to obtain a bright projected image that is sufficiently visible under a condition without interior illumination in the daytime.

The gist of the present invention resides in that a specific region that is a part of the display area of a display device in a mobile phone is used as an image modulator. Accordingly, various changes and modifications can be made to the type and configuration of the transmissive liquid crystal panel without departing from the spirit and scope of the present invention. The same is the case with the light source and the projection lens. Further, although a transmissive liquid crystal panel is used in the foregoing embodiments of the present invention, it is also possible to use other display devices such as a transmissive electrochromic device.

What is claimed is:

1. A mobile phone comprising:
    an information display device having a transmissive liquid crystal panel for information display, the transmissive liquid crystal panel having a specific region therein; and
    an image projection device having a light source that illuminates the specific region, the image projection device further having a projection lens that projects light emitted from the light source and received through the specific region,
    wherein the transmissive liquid crystal panel is displaceable between an information display position and an image projection position, wherein when the transmissive liquid crystal panel is in the image projection position, the specific region is aligned with the light source that illuminates the specific region in a direction of an optical axis of the light source, and
    the mobile phone further comprising a mobile phone body that houses the information display device and the image projection device;
    wherein the transmissive liquid crystal panel is slidably mounted on the mobile phone body so as to be displaceable between the information display position and the image projection position.

2. The mobile phone of claim 1, wherein the information display device further has a light source for illuminating the transmissive liquid crystal panel, wherein the light source for illuminating the transmissive liquid crystal panel and the light source that illuminates the specific region are different from each other.

3. The mobile phone of claim 2, wherein the light source that illuminates the specific region is a light-emitting diode device.

4. The mobile phone of claim 2, wherein the light source for illuminating the transmissive liquid crystal panel is a backlight unit.

5. The mobile phone of claim 1,
    wherein the projection lens is detachable with respect to the mobile phone body, wherein when the projection lens is attached to the mobile phone body, the projection lens is aligned with the light source that illuminates the specific region in the direction of the optical axis of the light source.

6. The mobile phone of claim 1, further comprising:
    a charger for electrically charging the mobile phone body, the charger being prepared separately from the mobile phone body;
    wherein the charger is detachably attachable to the mobile phone body to supply the image projection device with driving electric power for image projection.

7. The mobile phone of claim 1, wherein the projection lens has an effective area larger than an effective area of the specific region of the transmissive liquid crystal panel.

8. A mobile phone comprising:
    an information display device having a transmissive liquid crystal panel for information display, the transmissive liquid crystal panel having a specific region therein; and
    an image projection device having a light source that illuminates the specific region, the image projection device further having a projection lens that projects light emitted from the light source and received through the specific region,
wherein the transmissive liquid crystal panel is displaceable between an information display position and an image projection position, wherein when the transmissive liquid crystal panel is in the image projection position, the specific region is aligned with the light source that illuminates the specific region in a direction of an optical axis of the light source, and
the mobile phone further comprising a mobile phone body that houses the information display device and the image projection device;
wherein the transmissive liquid crystal panel is pivotally attached to the mobile phone body so as to be displaceable between the information display position and the image projection position.

9. The mobile phone of claim 8, wherein the projection lens is displaceable between a housed position in the mobile phone body and an image projection position outside the mobile phone body, wherein when the projection lens is in the image projection position, the projection lens is aligned with the light source that illuminates the specific region in the direction of the optical axis of the light source.

10. A mobile phone comprising:
an information display device having a transmissive liquid crystal panel for information display, the transmissive liquid crystal panel having a specific region therein;
an image projection device having a light source that illuminates the specific region, the image projection device further having a projection lens that projects light emitted from the light source and received through the specific region; and
a mobile phone body that houses the information display device and the image projection device;
wherein the projection lens is displaceable between a housed position in the mobile phone body and an image projection position outside the mobile phone body, wherein when the projection lens is in the image projection position, the projection lens is aligned with the light source that illuminates the specific region in the direction of the optical axis of the light source.

* * * * *